United States Patent
Xiao et al.

(10) Patent No.: US 7,026,820 B2
(45) Date of Patent: Apr. 11, 2006

(54) METHOD AND APPARATUS FOR MINIMIZING DIRECT COUPLING FOR DOWNHOLE LOGGING DEVICES

(75) Inventors: Jiaqi Xiao, Houston, TX (US); Li Gao, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 148 days.

(21) Appl. No.: 10/701,215

(22) Filed: Nov. 4, 2003

(65) Prior Publication Data

US 2005/0093547 A1    May 5, 2005

(51) Int. Cl.
*G01V 3/10*    (2006.01)
*G01V 3/18*    (2006.01)

(52) U.S. Cl. .............. 324/339; 324/345; 324/346; 324/347; 324/354; 324/355; 324/357; 324/358; 324/359; 324/360; 324/366; 324/368; 324/371; 324/335; 324/336; 324/337; 364/572.2

(58) Field of Classification Search ............... 324/339, 324/338
See application file for complete search history.

(56) References Cited

U.S. PATENT DOCUMENTS

| | | | | |
|---|---|---|---|---|
| 4,264,862 | A | * | 4/1981 | Koelle et al. ............... 324/339 |
| 5,065,099 | A | * | 11/1991 | Sinclair et al. ............. 324/339 |
| 5,757,191 | A | | 5/1998 | Gianzero |
| 6,100,696 | A | * | 8/2000 | Sinclair ...................... 324/339 |
| 6,600,995 | B1 | * | 7/2003 | Strickland et al. ............ 702/7 |
| 6,606,565 | B1 | * | 8/2003 | Strickland et al. ............ 702/7 |

\* cited by examiner

*Primary Examiner*—Michael Tokar
*Assistant Examiner*—Diane E. Jones
(74) *Attorney, Agent, or Firm*—Robert M. Tuttle; Conley Rose, P.C.

(57) ABSTRACT

A method and apparatus for minimizing direct coupling between transmitters and receivers on a downhole logging tool are disclosed. One embodiment includes a transmitter, a bucking device, and a plurality of receivers, where signals may be directly coupled from the transmitter into the receivers and signals may be indirectly coupled from the transmitter into the receivers through the formation and borehole environment. The bucking device minimizes the magnitude of the signals that are directly coupled from the transmitter into multiple receivers within the plurality. By varying the current in the bucking device, the bucking device minimizes the magnitude of the directly coupled signal of each receiver in the plurality, and each receiver may utilize a common bucking device.

30 Claims, 6 Drawing Sheets

METHOD AND APPARATUS FOR MINIMIZING DIRECT COUPLING FOR DOWNHOLE LOGGING DEVICES

FIELD OF THE INVENTION

This invention relates to induction well logging, and more particularly to a method for minimizing the undesirable coupling effects between downhole transmitters and receivers.

BACKGROUND OF THE INVENTION

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a petrophysicist regarding the particular earth formation being drilled.

In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with traditional techniques, various parameters of the earths formations are measured and correlated with the position of the sonde in the borehole as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors.

If knowledge of the formation properties are needed while drilling, sensors can also be deployed near the end of a drilling string. Measurements of formation properties can be measured and stored in memory for later retrieval and correlation with depth. Measurements can also be transmitted to the surface by pulses of mud pressure or other means. This process is referred to as "logging while drilling" (LWD).

For a formation to contain petroleum, and for the formation to permit the petroleum to flow through it, the rock comprising the formation must have certain well-known physical characteristics. In general, the electrical resistivity (i.e., opposition to the flow of electrical current) of formations containing hydrocarbons is high, and, the electrical resistivity of formations containing water is relatively low. Thus, if the porosity of an earth formation is known from other sensors, its electrical resistivity can assist the petrophysicist in determining the volume fraction of hydrocarbons in the formation.

Electrical resistivity is primarily measured using two methods. The first method includes sensors that utilize electrodes to force current to flow through the formation. By measuring the amount of voltage differential between the electrodes (with the amount of forced current known), the resistivity may be calculated. The second method utilizes coil-type sensors, also referred to as "induction devices" or "coils", to induce an alternating electromagnetic field in the formation. A rudimentary induction device arrangement comprises a two coil arrangement including a single transmitting coil and a single receiving coil. The electromagnetic field induced in the formation by the transmitting coil further induces alternating electric currents (or eddy currents) in the formation. These eddy currents in turn generate a secondary electromagnetic field in the formation, thereby inducing an alternating voltage at a receiving coil. The voltage measured by the receiving coil varies as the resistivity of the formation changes, and the volume fraction of hydrocarbons in the formation may be determined by measuring the voltage signal at the receiving coil.

Ideally, the signal received by the receiving coil only represents formation resistivity or conductivity. The transmitting coil also directly couples the transmitted signal into the receiving coil, however. In this manner, the signal received by the receiving coil comprises the signal from the surrounding formation as well as the signal that is directly coupled from the transmitting coil. The signal that is directly coupled between the transmitting coil and the receiving coil is a function of the mutual inductance between the two coils and contains no information about the formation. Also, the magnitude of the direct coupled signal can be several orders of magnitude larger than the signal from the formation, which may make it difficult to distinguish the desired formation signal from the undesired signal that is coupled directly from the transmitter. Thus, in order to measure the formation signal accurately, the direct coupling signal should be removed. The term "bucking" refers to removing or minimizing the portion of the received signal that is directly coupled into the receiving coil from the transmitting coil.

Traditionally, bucking is implemented by adding additional coils or "bucking coils" to the transmitting coil and/or the receiving coil. And, if the bucking coil is added to the transmitting coil, the same current flows in both the transmitting coil and the bucking coil.

An array-type induction tool consists of several sub-arrays. A sub-array may be defined as a set of coil configurations that is used to acquire elementary measurements of e.g., formation measurements in an array-type tool. The transmitter or transmitters in an array-type tool can be commonly shared across all sub-arrays. In some cases, a common receiver or common receivers can also be shared across all sub-arrays. Traditional methods and apparatus, however, do not have a bucking coil shared by the sub-arrays. Therefore, every sub-array has its own bucking coil or bucking coils.

Figure 1A:
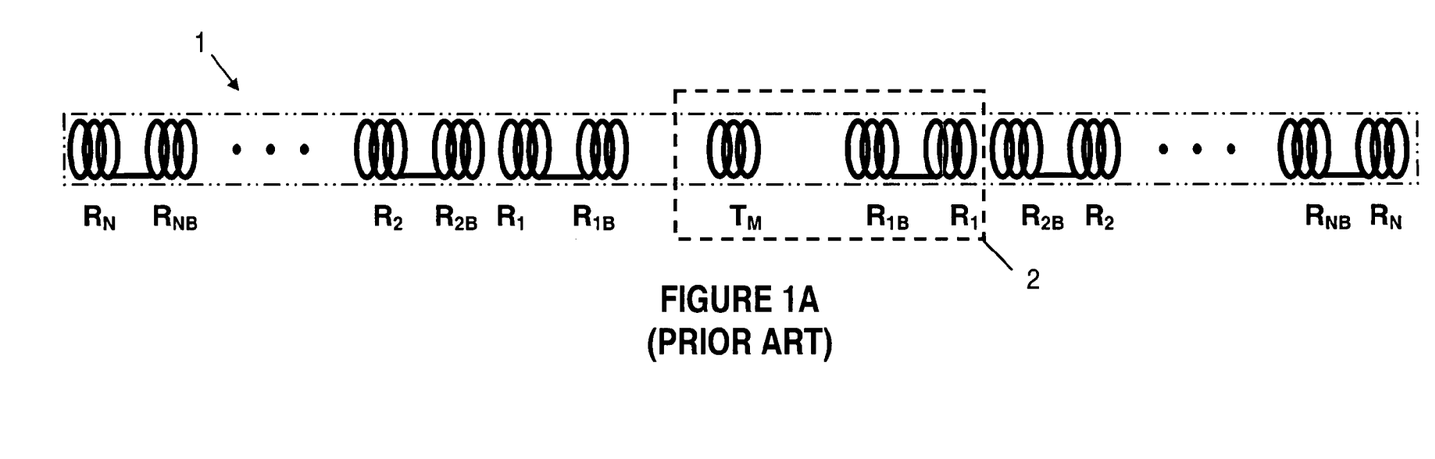
FIG. 1A–1C are illustrations of prior art induction logging systems.

FIG. 1A depicts a high resolution sensor array 1 for use in a resistivity tool. Sensor array 1 includes multiple sub-arrays, where each sub-array comprises the transmitter coil $T_M$, at least one receiving coil $R_N$, and at least one bucking coil $R_{NB}$ for each receiving coil; each receiving coil $R_N$ is spaced a predetermined distance away from the transmitter. The various sub-arrays use the same transmitter coil $T_M$ and each sub-array has its own bucking coil. Therefore, the number of bucking coils for sensor array 1 equals the number of sub-arrays. In this manner, a five coil "symmetrical" sub-array may be formed using the transmitting coil $T_M$, two symmetrically placed receiving coils $R_1$, and two symmetrically placed bucking coils $R_{1B}$. Alternatively, a three coil "non-symmetrical" sub-array 2 also may be formed using the transmitter coil $T_M$ along with a single receiving coil $R_1$ and the bucking coil $R_{1B}$ associated with the receiving coil $R_1$. Note that in the various arrangements, each sub-array requires at least one bucking coil corresponding to each receiving coil. Since conventional tools normally contain several sub-arrays, multiple bucking coils are often required, yet implementing numerous bucking coils on the downhole tool can be problematic for several reasons.

Figure 1B:
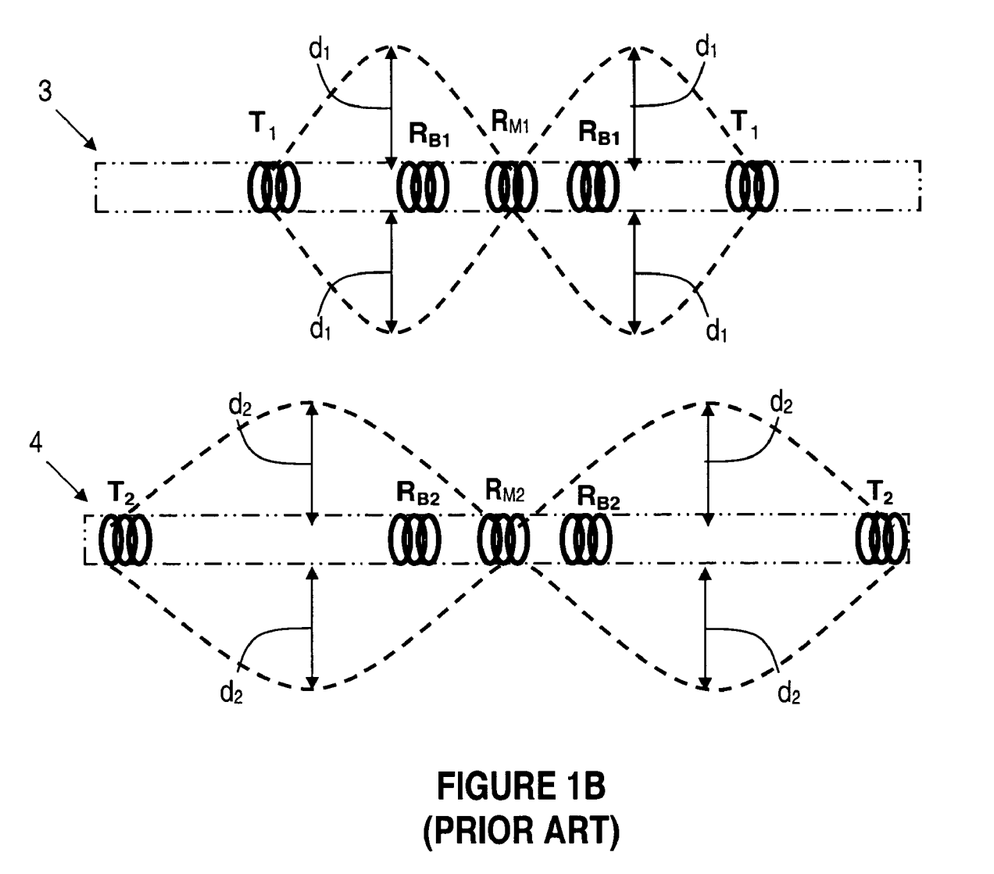

For some downhole tools, finding a suitable space on the downhole tool for the bucking coils of all sub-arrays can be difficult. In addition, as more sub-arrays are added to the downhole tool, finding a suitable space on the downhole tool for each bucking coil of each sub-array can be difficult. For example, FIG. 1B depicts two five-coil sub-arrays, sub-arrays 3 and 4, which may be implemented as a single high resolution tool. As illustrated, the purpose of the configuration is to measure the formation conductivity at different depths of investigation (i.e., $d_1$ and $d_2$). As illustrated, the receiving coil $R_{M1}$ for sub-array 3 is capable of receiving signals at an investigation depth of $d_1$, and the receiving coil $R_{M2}$ for sub-array 4 is capable of receiving signals at an investigation depth of $d_2$. Since the physical separation between transmitting coil $T_2$ and the receiving coil $R_{M2}$ is greater in sub-array 4 than the separation distance between transmitting coil $T_1$, and receiving coil $R_{M1}$, in sub-array 3, sub-array 4 is capable of receiving signals at an investigation depth of $d_2$, which is greater than the investigation depth $d_1$ of sub-array 3. Sub-arrays 3 and 4, illustrated in FIG. 1B, correspond to different depths of investigation, and as such, the number of windings in the bucking coils (i.e., $R_{B1}$, and $R_{B2}$) may differ between sub-array 3 and sub-array 4. Hence, separate bucking coils may be required for high resolution arrays, which may add to the number of coils required on the downhole tool.

Figure 1C:
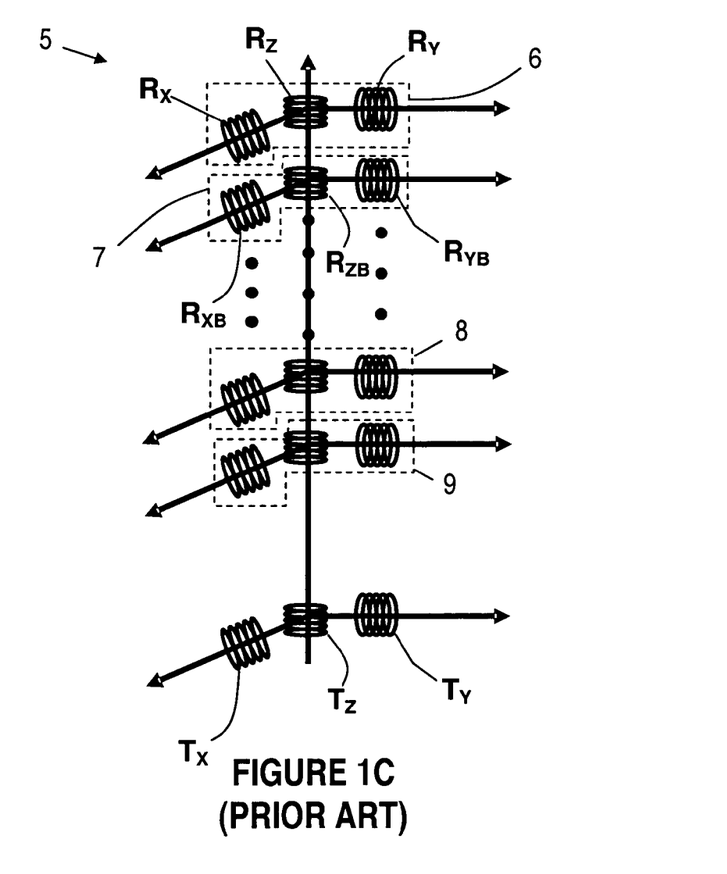

In addition, systems that utilize triple component transmit and receive coils (see e.g., U.S. Pat. No. 5,757,191 to Gianzero), may require extra bucking coils associated with each component of the receiving coil and further exacerbate this problem. For example, FIG. 1C illustrates a high resolution array 5 including a receiver coil 6 and a bucking coil 7, where the receiving coil 6 further comprises three component coils $R_X$, $R_Y$, and $R_Z$. Accordingly, the bucking coil 7 further comprises $R_{XB}$, $R_{YB}$, and $R_{ZB}$. In this manner, each additional three component receiver coil 8 will require a three component bucking coil 9 and increase the number of coils that must occupy the limited space on the downhole tool.

To achieve a sub-array with the direct coupling minimized, traditionally, there are only two variables, or two freedoms, of a bucking coil that can be adjusted, the position of the bucking coil or the number windings. This limited number of freedoms is the root cause of all the difficulties described above.

BRIEF SUMMARY OF THE INVENTION

A method and apparatus for minimizing coupling effects between coils on a downhole logging tool are disclosed. By allowing a bucking coil to transmit current and by controlling the current flowing in the bucking coil, the method adds an extra freedom to the design of induction downhole tools. With this extra freedom, three variables can be adjusted to minimize the direct coupling of a sub-array. They are the position of the bucking coil, the number windings and the current strength of the bucking coil.

One embodiment includes a transmitting coil, a bucking coil, and a plurality of receiving coils, where signals may be directly coupled from the transmitting coil into the receiving coil and signals may be indirectly coupled from the transmitting coil into the receiving coil. The bucking coil minimizes the magnitude of the signals that are directly coupled from the transmitting coil into multiple receiving coils within the plurality. By varying the current in the bucking coil, the bucking coil minimizes the magnitude of the directly coupled signal in each receiver in the plurality, and each sub-array may utilize a common bucking coil. In this manner, the amount of space available on the downhole logging tool may be maximized.

In another embodiment, a current controlling device may be coupled to the transmitting coil and the bucking coil and the current controlling device may provide current to the transmitting coil and the bucking coil. The current controlling device may selectively couple to various receiving coils within the plurality of receiving coils. The current provided to the bucking coil may be varied depending on the receiver that the current controlling device is coupled to. For example, with the current controlling device coupled to a receiving coil A the current controlling device may provide current A to the bucking coil, and if the current controlling device is coupled to a receiving coil B the current controlling device may provide a current B to the bucking coil.

In other embodiments, the current controlling device may provide the bucking coil a current having a frequency that is related to each receiving coil within the plurality of receiving coils. Additionally, the current controlling device may provide the bucking coil with a composite current, where the constituent components of the composite current vary in frequency and are associated with individual receiving coils within the plurality.

BRIEF DESCRIPTION OF THE DRAWINGS

For a more detailed understanding of the invention, reference will now be made to the Figures, wherein like components are indicated using like reference numbers.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . ."

The term "couple" or "couples" is intended to mean either an indirect or direct electrical connection. Thus, if a first device couples to a second device, that connection may be through a direct electrical connection, or through an indirect electrical connection via other devices and connections.

As used herein, the term "array" is intended to refer to a group of coils used for determining formation properties.

DETAILED DESCRIPTION OF THE INVENTION

Figure 2:
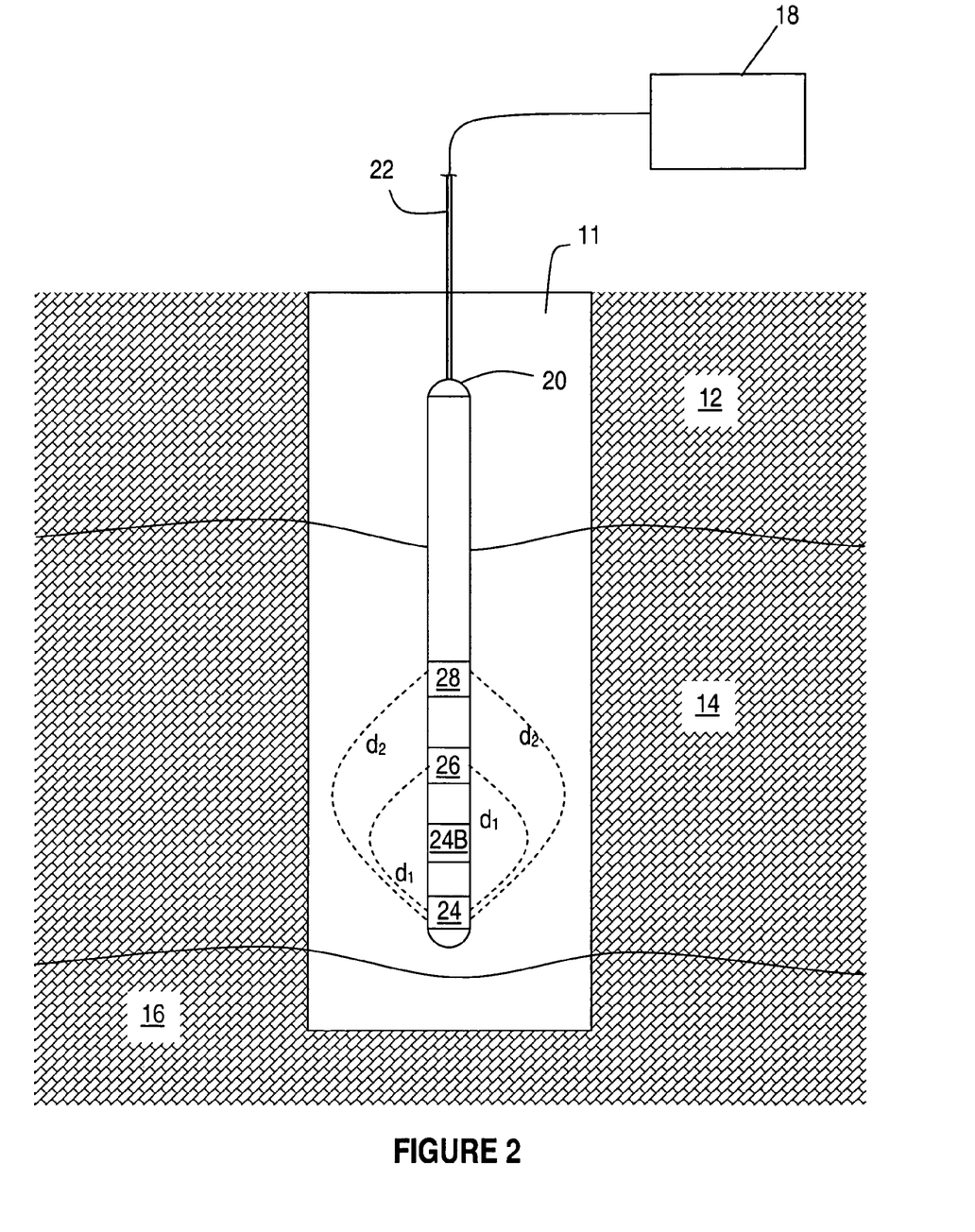
FIG. 2 is an illustration of a logging sonde.

FIG. 2 illustrates a general arrangement of an induction logging tool. A borehole or well 11 is drilled through several earth layers 12, 14, and 16. A logging sonde 20 is suspended within borehole 11 by a logging cable 22. Cable 22 provides mechanical support for the sonde 20 and contains suitable electrical conductors to provide power to the sonde 20 and to transmit control signals from equipment 18 at the surface of the earth to the sonde 20, and to transmit collected data from the sonde 20 to suitable recording media in equipment 18. Although FIG. 2 illustrates a sonde, the embodiments of the invention also may be implemented in LWD applications.

The sonde 20 is shown with four coil arrangements 24, 24B, 26, and 28. Coil 24 may be used to transmit logging signals and coils 26 and 28 may be used to receive signals. Although only one receiving coil 26 is required for a functional device, in general, induction logging tools have multiple receiver coil arrangements that are spaced away from coil 24 at various separation distances. The various separation distances between the transmitting and receiving coils allow the depth of the measurement as well as other parameters of the system to be varied. For example, the measurement by coil 26 may represent a depth $d_1$, whereas the measurement by coil 28 may represent a depth of $d_2$. Coil 24B preferably is a bucking coil implemented to nullify direct coupling effects in received signals. In traditional bucking arrangements, such as the system 2 illustrated in FIG. 1A, the amount of bucking is controlled by varying the number of windings and the positions of the coils. This approach requires at least one bucking coil for each sub-array and thus may require multiple bucking coils.

Although the invention is disclosed using coils to transmit, receive, and to cancel the direct coupling of the signal from the transmitter to the receiver, other embodiments of the invention may use an electrode to transmit, to receive, and to cancel the direct coupling of the signal from the transmitter to the one or more receivers. Still other embodiments of the invention may use various combinations of electrodes and/or coils to transmit, to receive, and to cancel the direct coupling of the signal from the transmitter to the one or more receivers. For example, one embodiment of the invention may use an electrode to transmit a signal and a coil to receive and a different coil to cancel the direct coupling of the signal from the transmitter to the one or more receivers.

In accordance with embodiments of the invention, the sonde 20 (shown in FIG. 2) may implement electronic bucking methods that limit the number of required bucking coils. Although the embodiment of FIG. 2 illustrates the bucking coil 24B disposed in between the transmitter and the receiver, in other embodiments of the invention, the bucking coil may be disposed at any point on the sonde or collar of the logging tool, so long as a single bucking coil cancels the direct coupled signal from the transmitter to the one or more receivers.

Figure 3:
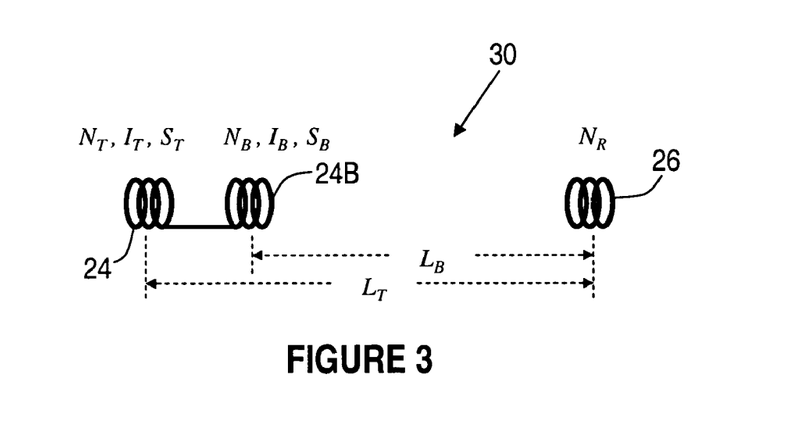
FIG. 3 is an illustration of an electronic bucking system.

FIG. 3 illustrates an exemplary sub-array 30, capable of implementing electronic bucking methods. The sub-array 30 includes the transmitter coil 24, the bucking coil 24B, and the receiving coil 26. FIG. 3 also depicts variables $N_x$, $I_x$, $S_x$, and $L_x$. $N_x$ corresponds to the number of windings of the coils. $I_x$ corresponds to the amount of current in the coils. $S_x$, corresponds to the cross sectional area of the coils. $L_x$ corresponds to the separation distance between the coils.

Equation 1 establishes a general relationship that may be utilized in selecting values for various parameters associated with sub-array 30 such that direct coupling contributions to the received signal are nullified. Applying Equation 1 to sub-array 30 yields Equation 2. Equation 2 may be further manipulated to determine the amount of current needed in the various coils, such as the bucking coil 24B, in order to nullify direct coupling contributions in receiving coil 26. Equation 3 represents manipulating Equation 2 to determine the amount of current necessary in the bucking coil 24B to nullify direct coupling contributions in signals received by coil 26

Referring to Equation 1, m is the number of transmitter coils, the index i refers to the i-th transmitter coil, n is the number of receiver coils, and the index j refers to the j-th receiver coil. $N_i$ and $N_j$ refer to the number of windings in the transmitter coil 24 and the receiver coil 26 respectively, $S_i$ and $S_j$ are the cross section areas of the i-th transmitter coil and the j-th receiver coil, and $L_{ij}$ represents the spacing between the transmitting coil 24 and the receiving coil 26.

$$\sum_{i,j=1}^{m,n} \frac{I_i N_i S_i N_j S_j}{L_{ij}^3} = 0 \quad \text{Eq. (1)}$$

Referring again to FIG. 3, the relationship established by Equation 1 may be used to select variable values for the components of sub-array 30 such that the direct coupling effects from the transmitting coil 24 to the receiving coil 26 are minimized using the bucking coil 24B. Equation 2 represents applying Equation 1 to sub-array 30.

$$\frac{I_T N_T S_T}{L_T^3} + \frac{I_B N_B S_B}{L_B^3} = 0 \quad \text{Eq. (2)}$$

Referring to Equation 2 and FIG. 3, $L_T$ represents the spacing from the transmitter coil 24 to the receiving coil 26, and $L_B$ represents the spacing from the bucking coil 24B to the receiving coil 26. Note that in some embodiments the transmitting coil and the receiving coil are substantially close to each other, and as such, the spacing $L_T$ is small. In addition, $N_T$ is the number of windings of the transmitter coil 24, $N_B$ is the number of windings of the bucking coil 24B, and $N_R$ is the number of windings of the receiving coil 26. $S_T$ is the cross section area of the main transmitter and $S_B$ is the cross section area of the bucking transmitter. The amount of current in the transmitting coil 24 is represented by $I_T$ and the amount of current in the bucking coil is represented by $I_B$. Solving Equation 2 for the current in the bucking coil $I_B$ yields Equation 3.

$$I_B = -\left(\frac{L_B}{L_T}\right)^3 \left(\frac{N_T S_T}{N_B S_B}\right) I_T \quad \text{Eq. (3)}$$

Equation 3 illustrates the relationship between the current in the bucking coil $I_B$ and the other variables of sub-array 30 in order to nullify the amount of direct coupling between transmitter coils and receiver coils. It should be noted that the variables related to the separation distance between coils in a sub-array (i.e., $L_T$ and $L_B$), the variables related to the number of windings in the various coils of a sub-array (i.e., $N_T$ and $N_B$) and the cross section areas of the coils (i.e., $S_T$ and $S_B$) are typically established when the sonde is designed. Conversely, the current in the transmitting coil $I_T$, and the current in the bucking coil $I_B$ may be dynamically adjusted while the sonde is operating, which may be particularly advantageous in multiple receiver systems. For example, the transmitting coil 24 and the bucking coil 24B may be part of multiple sub-arrays, and the values for the current $I_B$ and $I_T$ may be adjusted to different values for each sub-array.

Figure 4:
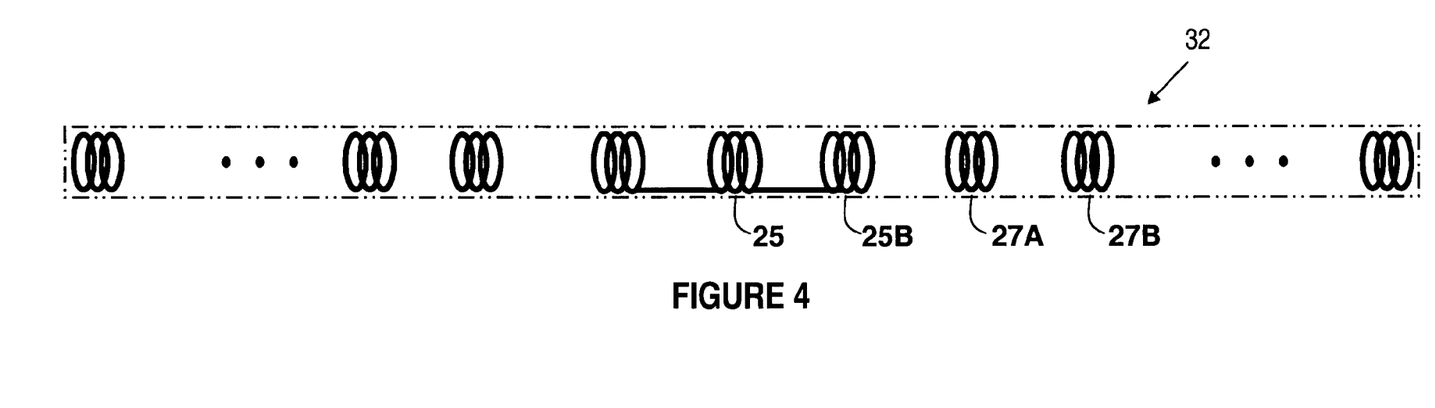
FIG. 4 is an illustration of an exemplary coil arrangement capable of employing electronic bucking.

FIG. 4 illustrates a system 32, where a single bucking coil may correspond to multiple receiver coils, and the current in the single bucking coil may be changed, according to Equation 3, as the bucking coil is used in conjunction with the various receiver coils. As shown, system 32 includes a transmitter coil 25 and a bucking coil 25B along with multiple receiver coils 27A, 27B, etc. such that each receiver coil is part of a separate sub-array. For example, receiver coil 27A along with transmitter coil 25 and bucking coil 25B may form a first sub-array, while receiver coil 27B along with transmitter coil 25 and bucking coil 25B may form a second sub-array. For each sub-array, the transmitter coil current $I_T$ and the bucking coil current $I_B$ will reflect the configuration of that particular sub-array as determined by Equation 3. Since each sonde may include multiple sub-arrays that share the transmitting coil 25 and the bucking coil 25B, the values for $I_T$ and $I_B$ in each sub-array may vary.

Figure 5:
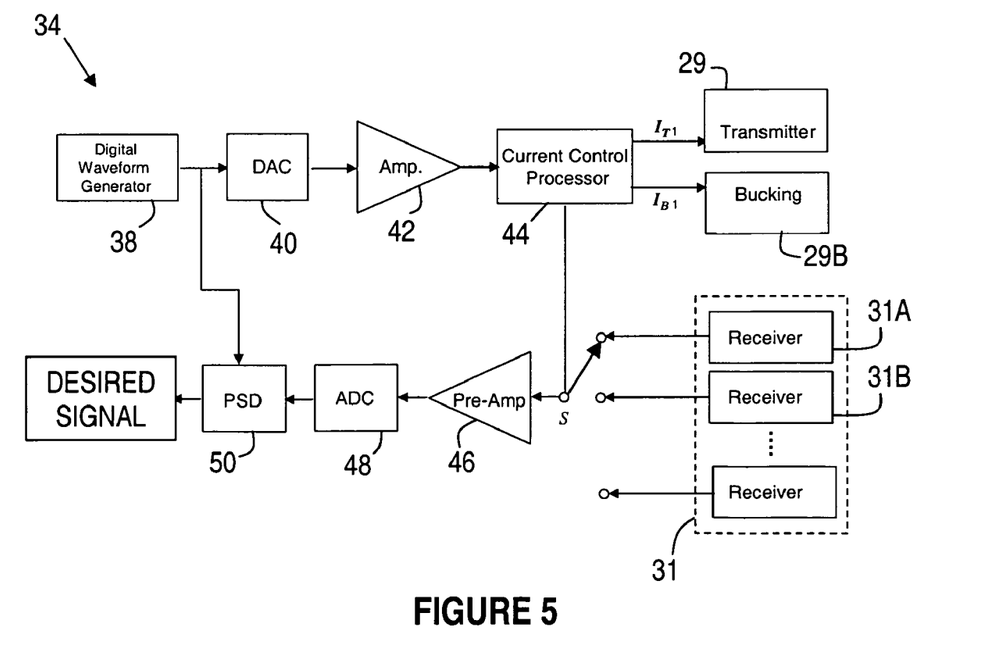
FIGS. 5 is an illustration of circuitry capable of implementing electronic bucking in the time-domain.

As noted above, electronic bucking may be used to minimize the number of bucking coils needed. FIG. 5 illustrates a system 34 employing time domain multiplexing. System 34 may be disposed on a sonde (akin to sonde 20 depicted in FIG. 2). System 34 includes a transmitting coil 29, a bucking coil 29B, and multiple receiving coils 31. The transmitting coil 29 and the bucking coil 29B may be combined with individual receiving coils to form various sub-arrays. The electronic bucking system 34 includes a transmission path comprising a digital waveform generator 38, a digital-to-analog converter (DAC) 40, an amplifier 42, and a current control processor 44. System 34 also includes a receive path comprising a pre-amplifier 46, an analog-to-digital converter (ADC) 48, and a phase sensitive detector (PSD) 50.

Digital waveform generator 38 converts the information stored in a storage device (not shown) into a digital waveform, and the DAC 40 converts the digital waveform into an analog signal. Digital waveforms from generator 38 may include waveforms with varying frequency and amplitude. Amplifier 42 amplifies the signal coming from the DAC 40 in preparation for transmission by the transmitting coil 29. The current control processor 44 utilizes the signal coming from amplifier 42 to coordinate the current delivered to coils 29 and 29B; in addition, current control processor 44 provides switching control in order to select among the various receiver arrangements. For example, if the current control processor 44 configures transmitter coil 29 and bucking coil 29B in a first sub-array with the first receiving coil 31A, then the current control processor 44 will provide a current $I_{T1}$, to the transmitting coil 29 as well as providing a current $I_{B1}$ to the bucking coil 29B. The value of $I_{T1}$, preferably will be set to a predetermined value based upon the desired transmission strength of signal, and with this value established, the current control processor 44 may determine the value of $I_{B1}$ using Equation 3. Alternatively, if the current control processor 44 configures transmitter coil 29 and bucking coil 29B in a second sub-array with the second receiving coil 31B, then the current control processor 44 may provide currents $I_{T2}$ and $I_{B2}$ that differ from the currents $I_{T1}$, and $I_{B1}$ provided in the first sub-array configuration. Again, the value of $I_{B2}$ will be based on the value of $I_{T2}$ per Equation 3.

Current control processor 44 may comprise a look-up table where the various sub-array configurations correspond to current values $I_T$ and $I_B$. Preferably, the current control processor 44 will be pre-configured to predetermined current values $I_T$ and $I_B$ that are determined when the sonde is designed. Alternatively, the current control processor 44 may dynamically configure the current values $I_T$ and $I_B$ after the system 34 is deployed downhole. Furthermore, the current control processor 44 may be reprogrammed as necessary, for example, as coils are replaced or re-configured on the sonde.

The pre-amplifier 46 couples to a receiver coil within the multiple receiver coils 31, where the receiver coil is designated by the current control processor 44. Pre-amplifier 46 amplifies the signal received by the receiving coil and provides this amplified signal to an analog to digital converter (ADC) 48, and ADC 48 converts the received signal into a digital form. A phase sensitive detector (PSD) 50 compares the phase of the incoming digital signal (from ADC 48) with the phase of the outgoing digital signal generated by the waveform generator 38. Signals which are in-phase with the outgoing digital signal represent the desired formation information.

Figure 6:
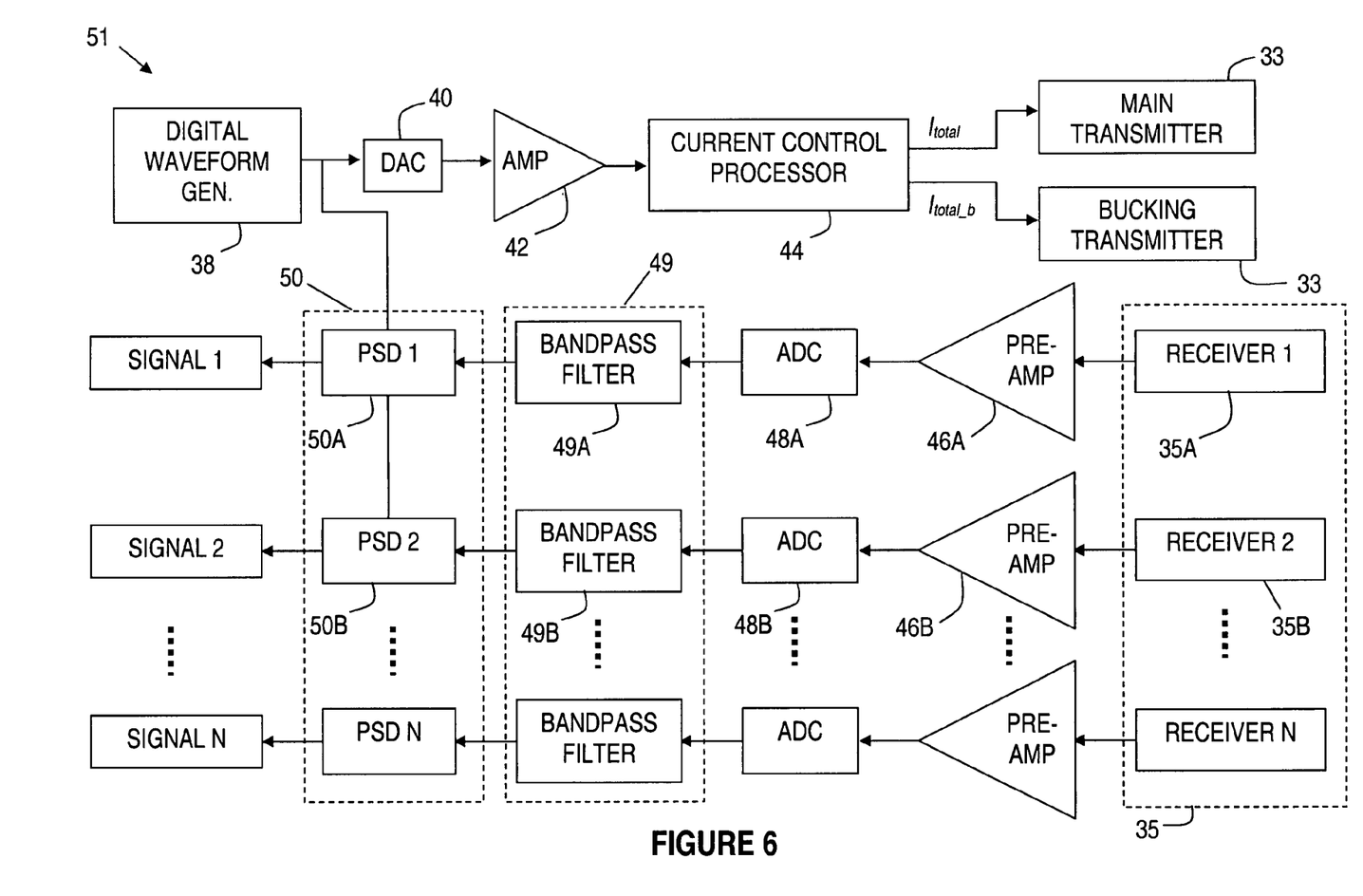
FIG. 6 is an illustration of circuitry capable of implementing electronic bucking in the frequency-domain.

FIG. 6 illustrates an alternate embodiment of an electronic bucking system 51 that employs frequency domain multiplexing instead of the time domain approach of system 34 (note that like components are indicated using like reference numerals). Notably, system 51 includes multiple receiver channels capable of operating at multiple frequencies simultaneously such that each channel contains a receiving coil (35A, 35B, etc.) that corresponds to a distinct frequency. The bucking current $I_B$ for each receiving coil can be expressed in Equation 4, where $I_T(f_i)$ is the current strength in a transmitter coil 33 due to the i-th receiver at frequency $f_i$, and $I_B(f_i)$ is the current strength in a bucking coil 33B due to the i-th receiver.

$$I_B(f_i) = -b_i I_T(f_i), i=1,2,\ldots,N \qquad \text{Eq. (4)}$$

The bucking coefficient $b_i$ of Equation 4 may be further determined using Equation 5, where $L^i_T$ corresponds to the transmitter-receiver spacing, and $L^i_B$ corresponds to the receiver-bucking coil spacing.

$$b_i = -\left(\frac{N_T S_T}{N_B S_B}\right)\left(\frac{L^i_B}{L^i_T}\right)^3, i=1,2,\ldots,N \qquad \text{Eq. (5)}$$

In system 51, the waveform generator 38 and the current control processor 44 digitally combine the various frequencies associated with each receiver into a single waveform such that the total current required for the transmitting coil 33 and the bucking coil 33B is given by Equations 6 and 7 respectively.

$$I_{total} = \sum_{i=1}^{N} i_T^i(f_i), \qquad \text{Eq. (6)}$$

$$I_{total\_B} = \sum_{i=1}^{N} i_B^i(f_i). \qquad \text{Eq. (7)}$$

In this manner, the bucking requirements associated with each receiver may be satisfied by generating a composite signal $I_{total}$ for both the transmitting coil 33 and the bucking coil 33B. Since the signal received at each receiver will contain the formation's response to all the transmitted frequencies, a bandpass filter 49 may be used to single out the distinct frequency associated with each channel. The PSD 50 for each channel preferably is a digital signal processor based system where each of the PSDs (i.e., PSD 50A, PSD 50B, etc.) produces the components received in each channel which are in-phase with the outgoing signal generated by the waveform generator 38. It should be noted that in some embodiments, system 34 and system 51 may be combined such that both frequency domain and time domain approaches may be combined.

Figure 7:
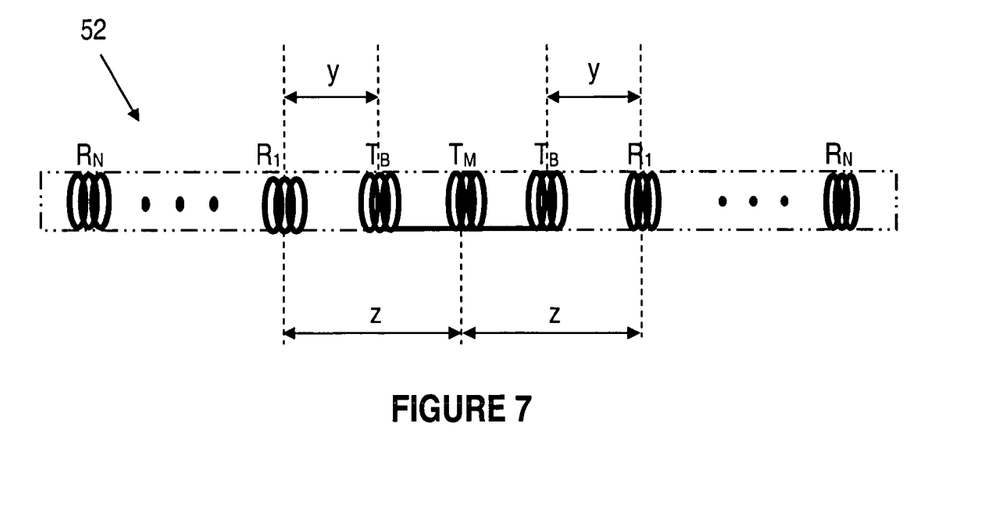
FIG. 7 illustrates another exemplary coil arrangement.

FIG. 7 illustrates an exemplary configuration of high resolution array 52 where the bucking coils $T_B$ as well as the transmitting coil $T_M$ may be shared among the various sub-arrays. Array 52 may be disposed on the sonde. Array 52 includes several sub-arrays comprising two receiving coils $R_x$, a transmitting coil $T_M$, and two bucking coils $T_B$. The receiving coils $R_x$ and bucking coils $T_B$ are symmetrically placed about the transmitting coil $T_M$. Array 52 includes numerous receivers (e.g., $R_1$ through $R_N$) disposed along the sonde such that investigation at varying depths may be accomplished by varying the location of each receiver. Despite the location of the various receiving coils, each sub-array in array 52 is capable of using the same bucking and transmitting coils by adjusting the amount of current in the bucking coils $T_B$ according to Equation 3. Allowing multiple receivers to share the transmitting and bucking coils enables the number of sub-arrays disposed on the sonde to be increased. Such an arrangement may be especially advantageous in sub-arrays that employ three-component coils. For example, U.S. Pat. No. 5,757,191 to Gianzero, which is incorporated by reference as if reproduced in full, discloses a three component coil that may benefit from electronic bucking.

Figure 8:
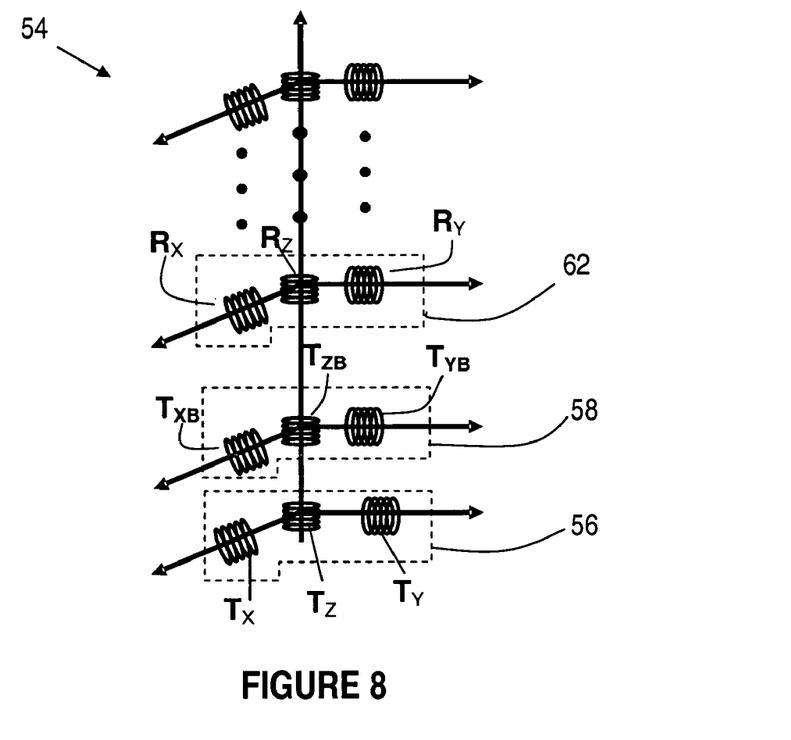
FIG. 8 illustrates an exemplary 3-coil arrangement.

FIG. 8 illustrates implementing electronic bucking in an array 54 comprising three component coils. Array 54 is depicted including a three component transmitting coil 56, a three component bucking coil 58, and a three component receiver coil 62. Akin to the arrangement illustrated in FIG. 7, the three-component bucking coil 58 and the three component receiver coil 62 are disposed about the three component transmitter coil 56. As illustrated in FIG. 8, implementing electronic bucking allows the three component transmitter 56 and its three-component bucking coil 58 to be utilized by the three-component receiver coil 62 as well as being utilized by other three-component receiver coils (not shown). Accordingly, Equation 3 is used to determine the amount of current required in the three-component bucking coil 58 for each receiving coil selected. In this manner, a single three component bucking coil 58 may be utilized to form multiple sub-arrays instead of using a separate three component bucking coil for each receiver as was the case in FIG. 1C. Thus, the amount of space available on sonde to incorporate coils may be increased by using electronic bucking methods that allow the bucking coils to be shared among various receiver coils.

The above discussion is meant to be illustrative of the principles and various embodiments of the present invention. Numerous variations and modifications will become apparent to those skilled in the art once the above disclosure is fully appreciated. For example, further signal processing may be employed to enhance the electronic bucking embodiments disclosed herein. It is intended that the following claims be interpreted to embrace all such variations and modifications. Although some embodiments of the invention disclose using coils to transmit, receive, and to cancel the direct coupling of the signal from the transmitter to the receiver, other embodiments of the invention may use an electrode to transmit, to receive, and to cancel the direct coupling of the signal from the transmitter to the one or more receivers. Still other embodiments of the invention may use various combinations of electrodes and/or coils to transmit, to receive, and to cancel the direct coupling of the signal from the transmitter to the one or more receivers. For example, one embodiment of the invention may use an electrode to transmit a signal and a coil to receive and a different coil to cancel the direct coupling of the signal from the transmitter to the one or more receivers.

Furthermore, signal processing may be employed to enhance the electronic bucking embodiments disclosed herein. Also, coils, representing magnetic dipoles, are commonly used as transmitters, receivers and bucking coils, but there are several different types of magnetic dipoles and electrical dipoles can be also used in induction logging tools. It is intended that the following claims be interpreted to embrace all such variations and modifications.

What is claimed is:

1. A well-logging tool, comprising:
   a transmitter disposed on the logging tool;
   a plurality of receivers disposed on the logging tool;
   a bucking device disposed on the logging tool; and
   a current controlling device that provides a current to the bucking device;
   wherein the current provided to the bucking device is varied based on which receiver is being used.

2. The well-logging tool of claim 1, wherein the bucking device comprises any one of an electrode and a coil.

3. The well-logging tool of claim 1, wherein the transmitter comprises any one of an electrode and a coil.

4. The well-logging tool of claim 1, wherein each receiver in the plurality of receivers comprises any one of an electrode and a coil.

5. The well-logging tool of claim 1, wherein each receiver in the plurality of receivers comprises any one of a three-component receiver and a single-component receiver.

6. The well-logging tool of claim 1, wherein the bucking device comprises a bucking coil and the transmitter comprises a transmitting coil and the bucking coil and the transmitting coil are wound around a desired axis in opposite directions.

7. The well-logging tool of claim 1, wherein the transmitter and each receiver in the plurality are separated by predetermined distances arid the predetermined distances are different for each receiver in the plurality.

8. The well-logging tool of claim 1, wherein the plurality of receivers receive signals and at least a portion of the received signals comprise signals directly coupled from the transmitter, and wherein the bucking device minimizes the magnitude of the signal that is directly coupled from the transmitter to the plurality of receivers.

9. The well-logging tool of claim 8, wherein minimizing the magnitude is determined by an amount of current in the bucking device.

10. A method of induction well-logging comprising:
transmitting a first signal with a transmitter;
receiving a second signal with a receiver, wherein the second signal comprises a first portion and a second portion, wherein the first portion is directly coupled from the transmitter and the second portion is indirectly coupled from the transmitter;
providing a current with a current controlling device to a bucking device;
transmitting a third signal with the bucking device simultaneously with the first signal, wherein the third signal minimizes the magnitude of the first portion of the second signal and wherein the magnitude at the third signal is different from the magnitude of the first signal; and
varying the current in the bucking device to accommodate a plurality of receivers.

11. The method of claim 10, wherein a current in the bucking device is pre-calculated.

12. The method of claim 10, wherein the receiver comprises any one of a three-component receiver and a single-component receiver.

13. The method of claim 10, wherein the bucking device is separated from the receiver by a predetermined distance.

14. A well-logging tool, comprising:
a first sub-array comprising a transmitting coil, a bucking coil, and a first receiving coil;
a second sub-array comprising the transmitting coil, the bucking coil, and a second receiving coil;
a current controlling device that provides a current to the bucking coil;
wherein, the first and second receiving coils receive signals that are directly coupled from the transmitting coil and signals that are indirectly coupled from the transmitting coil; and
wherein the current provided to the bucking coil is varied based on whether the first or second receiver is being used.

15. The well-logging tool of claim 14, wherein the minimization of the magnification provided by the bucking coil is determined by a current in the bucking coil.

16. A well-logging tool comprising:
a current controlling device;
a transmitting coil coupled to the current controlling device;
a bucking coil coupled to the current controlling device; and
a plurality of receiving coils, wherein the current controlling device selectively couples to at least one receiving coil within the plurality of receiving coils;
wherein the current controlling device provides current to the bucking coil and wherein the amount of current provided to the bucking coil depends on which receiving coil is selected by the current controlling device.

17. The well-logging tool of claim 16, wherein the current controlling device provides pre-determined amounts of current to the bucking coil based on which receiving coil is selected.

18. The well-logging tool of claim 16, wherein the current controlling device further comprises a look-up table that is pre-configured to provide current values for the bucking coil based on the various receiving coils within the plurality of receiving coils.

19. The well-logging tool of claim 18, wherein the look-up table is pre-programmed for varying arrangements of receiving coils.

20. The well-logging tool of claim 16, wherein the current controlling device dynamically provides a plurality of current values.

21. A method of induction logging, comprising:
providing a signal with a transmitting coil;
receiving the signal with a plurality of receiver coils, wherein the signal received by each receiver coil comprises a first portion that is directly coupled from the transmitting coil and a second portion that is indirectly coupled from the transmitting coil;
providing a current to a bucking coil with a current controlling device, wherein the current controlling device selectively couples to at least one receiver coil in the plurality;
varying the current provided to the bucking coil, and wherein the current provided to the bucking coil is varied based on which receiver coil the current controlling device is coupled to.

22. The method of claim 21, further comprising minimizing the magnitude of the first portion of the received signal using the bucking coil.

23. The method or claim 21, wherein the current in the bucking coil is determined by:

$$I_B = -\left(\frac{L_B}{L_T}\right)^3 \left(\frac{N_T S_T}{N_B S_B}\right) I_T$$

wherein $L_B$ is the distance from the bucking coil to the receiving coils, $L_T$ is the distance from the transmitting coil to the receiving coils, $N_B$ is the number of windings in the bucking coil, and $N_T$ is the number of windings in the transmitting coil, $S_B$ is the cross sectional area of the bucking coil, and $S_T$ is the cross sectional area of the transmitting coil.

24. A well-logging tool comprising:
a current controlling device;
a transmitting coil coupled to the current controlling device;
a bucking coil coupled to the current controlling device; and
a plurality of receiving coils, wherein each receiver coil is adapted, to receive a signal from the transmitting coil at a predetermined frequency and wherein the signal received by the receiver coil comprises a first portion that is directly coupled from the transmitting coil and a second portion that is indirectly coupled from the transmitting coil;
wherein the current controlling device provides a current to the bucking coil and wherein the current provided to the bucking coil corresponds to the predetermined frequencies associated with each receiving coil in the plurality.

25. The well-logging tool of claim 24, wherein the current provided to the bucking coil is provided by:
$I_B(f_i) = -b_i \cdot I_T(f_i)$, i=1, 2, . . . , N where 1/N is greater than zero; and
wherein $I_T(f_i)$ is the current in the transmitting coil due to the i-th receiving coil at frequency $f_i$, and $I_B(f_i)$ is the current in the bucking coil due to the i-th receiving coil at frequency $f_i$, and b is a bucking coefficient given by $$b_i = -\left(\frac{N_T S_T}{N_B S_B}\right)\left(\frac{L_B^i}{L_T^i}\right)^3, i = 1, 2, \ldots, N; \text{ and}$$

wherein $L_T^i$ corresponds to the spacing between the transmitting coil and the receiving coil, and $L_B^i$ corresponds to the spacing between the receiving coil and bucking coil and, $N_T$ is the number of windings of the transmitting coil, $N_B$ is the number of windings in the bucking coil, $S_B$ is the cross sectional area of the bucking coil, and $S_T$ is the cross sectional area of the transmitting coil.

26. The well-logging tool of claim 24, wherein the total bucking current is determined by:

$$I_{\text{total\_B}} = \sum_{i=1}^{N} i_B^i(f_i),$$

where 1/N is greater than zero and wherein $I_T(f_i)$ is the current in the transmitting coil due to the i-th receiving coil at frequency $f_i$ and $I_B(f_i)$ is the current in the bucking coil due to the i-th receiving coil at frequency $f_i$.

27. The well-logging tool of claim 24, wherein the bucking coil transmits a composite signal related to the frequencies of at least two receiving coils.

28. The well-logging tool of claim 24, wherein the composite signal minimizes the magnitude of the first portion of the received signal in the receiving coils.

29. The well-logging tool of claim 24, wherein the receiving coils comprise three-component coils and single-component coils.

30. The well-logging tool of claim 24, wherein the plurality of receiving coils are coupled to a bandpass filter.

\* \* \* \* \*